3,169,368
COMBUSTION CHAMBER FOR LIQUID FUELS
German Munding, Ottobrunn, near Munich, Germany, assignor to Bölkow-Entwicklungen Kommanditgesellschaft, Ottobrunn, near Munich, Germany
Filed Feb. 7, 1961, Ser. No. 87,583
3 Claims. (Cl. 60—39.66)

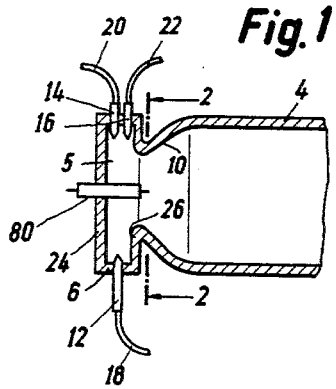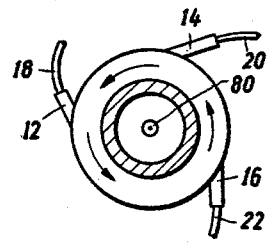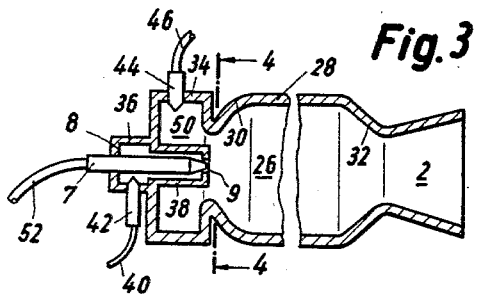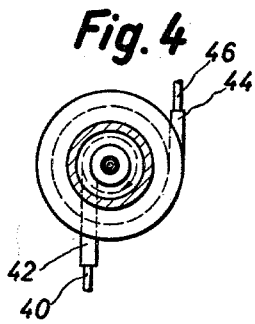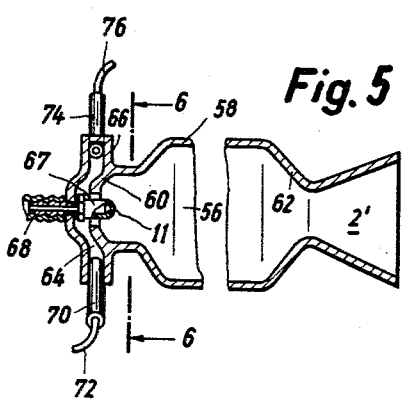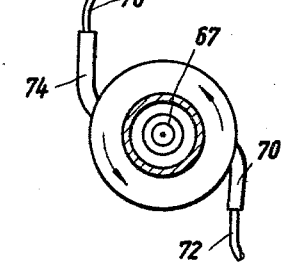

This invention relates in general to combustion chamber construction and operation and in particular to a new and useful combustion chamber construction including means for directing one or more fuel components and/or water tangentially into and along the walls of the combustion chamber for cooling purposes and/or for the production of steam for propulsion purposes.

The present invention has particular application for rocket-type engines wherein fuel components are burned in a closed combustion chamber and directed outwardly past a nozzle section formed at one end thereof. Combustion chambers of this character have been known which burn liquid fuels in which a cooling agent or a spray of the cooling agent is injected by means of atomizing nozzles which are provided on the outer circumference of the chamber. In such combustion chamber arrangements, the cooling agents generally used comprise a liquid which has a very large heat of evaporation and which liquid has the property or characteristic of forming a layer of coolant against the inner side of the combustion chamber wall. Most of these systems, however, do not function properly to provide a dense layer or veil of the cooling agent against the combustion chamber walls. In addition, the combustion chambers which are equipped with known injection systems for introducing cooling agents require additional expenditure in the construction and arrangement of these systems and, of course, they negatively effect the overall weight of the combustion chamber and the weight of the entire engine.

In accordance with the present invention, there is provided a combustion chamber which not only has means for effecting a very adequate combustion wall cooling, but also provides a simple and effective construction which operates correctly with a minimum of maintenance for many types of combustion chamber uses.

In accordance with the invention, a combustion chamber is provided which includes means for directing a cooling agent tangentially into the combustion chamber under high velocity conditions at which the cooling agent is directed around the walls thereof. In a preferred arrangement of the invention, there is provided a pre- or ante-chamber which is arranged to connect one end of the main combustion chamber portion and which includes one or more nozzles for directing one or more cooling agents tangentially into the swirl or ante-chamber for subsequent flow into the main combustion chamber portion. With such a construction a continuous cooling layer or veil of cooling agent material of great density is produced in the areas directly adjacent the combustion chamber wall. This cooling layer, caused by directing liquid such as water or a fuel component tangentially along the walls in an axially progressing helix, protects the chamber wall from contact by the hot combustion gases during the operation of the combustion chamber.

It is important in accordance with the present invention that when the coolant is directed into the pre-chamber it is directed at high velocity and in a tangential and somewhat axial direction so that the coolant is directed in a cooling veil against the walls of the swirl or ante-chamber and thence into the combustion chamber along the walls thereof. The kinetic energy imparted by the means to direct the coolant into the chambers is large enough so that the cooling layer or veil is maintained along the entire length of the combustion chamber wall.

A feature of the invention is that one or more of the fuel components is employed as a cooling fluid for cooling the combustion chamber. This is particularly advantageous since in a combustion chamber of this type the efficiency or output is substantially dependent on the degree of mixture between the components of the fuel, such as fuel oil and oxygen, or oxygen containing materials. Thus, in accordance with the invention, the oxygen or other liquid fuel components are directed tangentially into a swirl or ante-chamber at circumferentially spaced locations in quantities and at velocities to insure excellent mixing of the fuel components.

In some instances, the combustion chamber is operated employing a cooling agent in addition to the fuel components of liquid fuel-oil oxygen and or an oxygen containing carrier. This cooling agent is usually water which is advantageously introduced in a tangential direction against the walls of the chamber also.

In accordance with one embodiment, one of the fuel components is injected through a central nozzle which is arranged axially in the combustion chamber to direct discharge directly into the main combustion chamber space. Suitable means are provided in the nozzle to give the fuel component thus injected a whirling motion directing it outwardly against the walls of the main combustion chamber portion. It has been found, in accordance with the invention, that substantially similar results can be obtained where the liquid fuel-oil is directed axially into the main combustion chamber and the liquid oxygen, and, in some instances, water is injected tangentially into a swirl or ante-chamber which leads into the main chamber.

In accordance with another embodiment of the invention, one or more swirl or ante-chambers are provided in which separate fuel components are introduced and a third fuel component is introduced axially directly into the main combustion chamber. Of course, it is within the scope of the invention to employ either of the swirl or ante-chambers for any of the fuel components desired and, of course, to interchange the fuel component which is directed axially into the combustion chamber.

In a combustion chamber arrangement of the present invention where the cooling agent and the fuel components have been directed tangentially into the swirl or ante-chambers, and liquid oxygen is injected directly into the main combustion chamber through a centrally arranged twisting spray nozzle, a complete and rapid reaction can be obtained for combustion purposes.

In accordance with the invention, a twist or spin is imparted to the cooling agent by the tangential introduction thereof into the swirl or ante-chamber and this is done at sufficient velocity and force to create a cooling veil of liquid along the complete length of the combustion chamber. The fuel component swims on this cooling veil as a second thin layer. Liquid oxygen which is mechanically whirled by a central nozzle directly into the main combustion chamber effects combustion to cause a thermo reaction upon the fuel component which swims on the cooling veil adjacent the combustion chamber walls. Due to the small heat of evaporation and the small drop size of liquid oxygen, the liquid oxygen is transferred very rapidly into the gaseous state due to the heat energy which is present in the combustion chamber. The fuel is vaporized by the heat which is absorbed by the combustion chamber walls. The fuel and the oxygen thus mix in the gaseous stage whereby a rapid and stable reaction is assured.

It has been ascertained that a combustion chamber of this invention may be used not only for rocket engines but for operating flow machines such as a steam turbine, for example. For this purpose, according to a further feature of the invention, the fuel component having oxygen or oxygen carrying material is burned in stoichiometric quantities in the main combustion chamber and water is introduced therein for the purpose of producing steam in the combustion chamber. The amount of the cooling medium which is required for effecting cooling has to be in a certain relation or ratio to the entire throughput amount of the cooling medium including each of the fuel components. The throughput amount of the entire cooling medium should be relatively small so that the specific consumption (kilograms per second) with regard to the oxygen and the other fuel components does not increase beyond definite proportions. For this purpose a cooling agent, such as water, is advantageous. The latent heat of evaporation of water is very high, which makes it very suitable as a cooling medium.

Accordingly, it is an object of this invention to provide a combustion chamber having improved means for cooling the walls thereof.

A further object of the invention is to provide a combustion chamber in which one or more fuel components are given a whirling movement prior to their introduction into the combustion chamber to effect direction of a portion of the component along the combustion chamber walls for cooling purposes.

A further object of the invention is to provide a combustion chamber construction including a swirl or ante-chamber formed at one end thereof and including means for introducing one or more fuel components and/or cooling media tangentially into the swirl or ante-chamber and thence into the main combustion chamber for creating a cooling veil along the walls thereof.

A further object of the invention is to provide a combustion chamber having means for introducing a fuel component or oxygen axially directly into a main combustion chamber and for introducing other fuel components tangentially into pre-chambers for imparting a twisting motion to the component by directing the component tangentially against the walls at high velocities and force.

A further object of the invention is to provide a combustion chamber construction in which a fuel component or liquid oxygen is introduced axially into a combustion chamber imparting a twisting direction thereto for flow against the walls of the combustion chamber at the point of introduction and further including a pre-chamber having means for introducing one or more other fuel components tangentially thereinto.

A further object of the invention is to provide a combustion chamber having means for introducing at least two separate fuel components thereinto tangentially against the walls of the combustion chamber for cooling purposes and including means for introducing water in an amount to create steam.

A further object of the invention is to provide a method of operating a combustion chamber comprising separately directing at least two fuel components tangentially into a combustion chamber at a force and velocity to effect the formation of a cooling veil of the fuel component along the interior walls of said chamber.

A further object of the invention is to provide cooling for combustion chamber walls comprising directing at least one fuel component tangentially along the walls of the combustion chamber to form a cooling veil therealong.

A further object of the invention is to provide a method of operating a combustion chamber comprising introducing one fuel component directly into a main combustion chamber from an axially introduced location wherein the fuel is directed tangentially against the walls of the combustion chamber and further including introducing at least one other fuel component tangentially into a swirl or ante-chamber with a force to cause it to form a cooling veil therealong the length of the combustion chamber.

A further object of the invention is to provide a combustion chamber construction which is simple in design, rugged in construction and economical to manufacture.

The various features of novelty which characterize the invention are pointed out with particularity in the claims annexed to and forming a part of this application. For a better understanding of the invention, its operating advantages and specific objects attained by its use, reference should be had to the accompanying drawings and descriptive matter in which there are illustrated and described preferred embodiments of the invention.

In the drawings:

FIG. 1 is a somewhat schematic partial longitudinal section of a combustion chamber constructed in accordance with the invention;

FIG. 2 is a section taken on the line 2—2 of FIG. 1;

FIG. 3 is a somewhat schematic longitudinal section of another embodiment of combustion chamber;

FIG. 4 is a section taken on the line 4—4 of FIG. 3;

FIG. 5 is a somewhat schematic longitudinal section of another embodiment of combustion chamber; and FIG. 6 is a section taken on the line 6—6 of FIG. 5.

Referring to the drawings in particular, the invention embodied therein includes a cylindrical wall 4 defining a main combustion chamber 1 and a cylindrical wall 6 defining a swirl or ante-chamber 5 connected thereto by means of a frustro conical wall portion 10 (FIGS. 1 and 2). In this embodiment, three separate nozzles 12, 14 and 16 are arranged at circumferentially spaced locations on the cylindrical wall 6 and each is connected by means of suitable pressure supply lines 18, 20 and 22, respectively, to direct separate components of fuel tangentially into the swirl or ante-chamber 5 at circumferentially spaced locations.

The swirl or ante-chamber 5 is closed by a bottom 24 and the fuel components which are directed into the pre-chamber are directed over a vertical wall portion 26 and tangentially and axially along the walls of portions 10 and 4. The components form a thin coating or veil of coolant which effects complete cooling of the walls of the combustion chamber.

In the embodiment indicated in FIGS. 1 and 2, the fuel components include liquid fuel oil which is directed through the supply line 22 and nozzle 16, liquid oxygen which is directed through the supply line 18 and nozzle 12 (in some instances a carrier containing oxygen is used), and a cooling medium, such as water, which is directed through supply line 20 and the nozzle 14.

In order to insure that a dense thin cooling veil of coolant is distributed along the walls 4 of the combustion chamber 1, as well as the walls 6 of the swirl or ante-chamber, the cooling medium is given a twisting and somewhat axial direction of movement at high force and velocity. This is achieved by the tangential introduction of the various components of the fuel in an axial direction toward the main combustion chamber.

In all embodiments, the fuel which is contemplated is a fuel oil where the cooling agent is advantageously water. The advantages of water are that it has a high latent heat of vaporization and it is very inexpensive. Because each of the components has different weights, the cooling medium which is heavier bears directly against the combustion chamber wall 4 in the form of a veil or fog. The lighter oil component swims on this veil as a second thin layer while the gaseous oxygen fills the remaining space of the combustion chamber in the form of a rotating cylinder of this material.

The cooling medium transfers a portion of its heat which it absorbs from the combustion chamber wall 4 to the oil and this causes evaporation of the oil. In this manner there occurs a mixing of the oil in the oxygen in the gaseous phase so that a very good, intimate and rapid reaction occurs.

In FIGS. 3 and 4, there is indicated another embodiment which includes a main combustion chamber 26 formed by a central cylindrical wall 28 having frustro conical end walls 30 and 32 at each end. The frustro conical wall 32 leads into a nozzle section 2 at the trailing end of the combustion chamber device. A first pre-chamber is formed by cylindrical walls 34 and a second pre-chamber is formed by cylindrical walls 36. An inwardly extending cylindrical portion 38 is defined as an extension of the walls 36 which terminates below the inner end of the frustro conical wall 30 and is provided with a central opening 9.

In accordance with the embodiments of FIGS. 3 and 4, oxygen is introduced from a pressure conduit 40 through a nozzle 42 into a pre-combustion chamber 8 formed by the cylindrical walls 36 and thence it is directed outwardly through the opening 9 and into the main combustion chamber 26. Water is directed through a nozzle 44 fed from a pressure conduit 46 and into a swirl or ante-chamber 50 defined by the cylindrical walls 34. The other fuel component, which is oil, is introduced by means of a nozzle 7 which is supplied from a pressure conduit 52. The inner end of the nozzle 7 is disposed in the opening 9 and directs the fuel oil tangentially against the walls 28 of the combustion chamber 26.

By means of the nozzle 7 the oil is atomized very finely and is injected in this state into the main combustion space 26. The gaseous oxygen directed inwardly through the nozzle 42 emerges in a tangential twirling motion and proceeds in an axial direction from the pre-chamber 8 through the opening 9. In this manner the oil-oxygen mixture is forced to perform a rotating or circulating movement which causes a mechanical preparation of the fuel and oxygen and an intimate mixing of the two components.

In FIGS. 5 and 6, there is indicated a combustion chamber 56 defined by a cylindrical wall 58 and frustro conical walls 60 and 62 at each end thereof. A swirl or ante-chamber 64 is formed by a cylindrical wall portion 66. A tubular nozzle 67 extends inwardly from the wall portion 66 to the lower end of the frustro conical portion 60 and terminates in a discharge opening 11 at that location. Liquid oxygen is directed from a pressure line 68 into the nozzle 67 where it is whirled outwardly against the walls 60 and 58 of the combustion chamber 56. Cooling medium is supplied through a nozzle 70 fed from a pressure line 72 and fuel oil is supplied from a nozzle 74 fed from a pressure line 76.

The nozzles 70 and 74 are directed to discharge tangentially into the pre-chamber 64 and the fuel and the cooling medium are given a whirling and axial direction of movement to cause the coolant to adhere to the walls 60 and 58 of the combustion chamber 56. Because the water is heavier than the oil, the oil swims on a cooling veil of water as a second thin layer. The supply of oxygen which is directed through the nozzle 67 is mechanically atomized and directed into the combustion space 56. The oxygen is thus directed outwardly in a gaseous state and mixes with the oil similarly atomized to provide a rapid and complete reaction.

It has been ascertained that the combustion chambers indicated in each of the embodiments of FIGS. 1 to 6 may be used in a very advantageous manner as a gas or steam generator for driving flow machines such as gas or steam turbines. For the purpose of driving a steam turbine, fuel is burned with the oxygen in precise amounts to obtain a complete reaction in the main combustion chamber. Steam is produced by directing the cooling agent into the pre-chamber portion. When the combustion chamber is used in a rocket engine, one needs a water addition of about 20% of the total components in order to obtain a good cooling veil. This 20% water is calculated on the entire throughput and is a minimum amount. If one mixes water in the range of 30% to 80% corresponding to or dependent on the desired steam temperature to be obtained, then the combustion chamber of FIGS. 1 to 6 will work as a steam producer or generator. Similarly, other coolants may be introduced to convert the apparatus into a vapor generator as desired.

The steam or other vapor which is produced by the device may be directed by conduits connected to the trailing section or nozzle portion 2 and leading to, for example, a turbine.

Ignition of the oil-oxygen mixture in each of the combustion chambers indicated in FIGS. 1 to 6 is accomplished by means of an ordinarily available spark plug or hot plug 80 (FIG. 1) or other igniting means. The electrode of the spark plug, for example, in the combustion chamber of FIG. 3, projects through the opening of the centrally arranged nozzle 7 and into the main combustion space. The details of the ignition means have been omitted from the drawings in FIGS. 3 to 6 for clarity of illustration purposes only.

Thus, the invention provides means for easily and effectively cooling the walls of a combustion chamber. The cooling arrangement and method according to the invention is independent of the type of combustion chamber in which the invention is practiced. The fundamental principle is that the coolant is given a whirling or turning movement prior to its entering the main combustion space of the combustion chamber to cause a thin dense cooling veil which extends along the entire length of the inner walls of the main combustion space. The combustion chamber of this invention is simple, operates well, and may be used for many purposes.

While specific embodiments of the invention have been shown and described in detail to illustrate the application of the invention principles, it will be understood that the invention may be embodied otherwise without departing from such principles.

What is claimed is:

1. A rocket engine for liquid fuels comprising a relatively axially elongated combustion chamber having a circular cross section and including a substantially cylindrical main section; an axially relatively short swirl chamber having a circular cross section and coaxial with said combustion chamber at the entrance of the latter; said swirl chamber including cylindrical wall means and axially spaced end wall means having portions extending substantially perpendicular to said cylindrical wall means, one of said end wall means having a relatively small diameter circular opening communicating with said combustion chamber; said combustion chamber having an entrance transition section between said circular opening and said substantially cylindrical main section and progressively increasing in diameter from said circular opening; first and second nozzle means opening through the cylindrical wall means of said whirl chamber and arranged to direct a fluid into the latter tangentially thereof and with an axial velocity component; means for delivering a relatively heavy liquid coolant at a high velocity to said first nozzle means to form a swirling layer of liquid coolant on the inner surface of said swirl chamber and said combustion chamber and moving axially of said combustion chamber; means for delivering a relatively lighter liquid fuel at high velocity to said second nozzle means to form a swirling layer of liquid fuel on the inner surface of said layer of coolant and moving axially of said combustion chamber; and means for introducing a combustion supporting gas into said combustion chamber for admixture with said liquid fuel; said transition section maintaining continuity of said layer of liquid coolant throughout the length of said inner surface of said combustion chamber to maintain said layer of liquid fuel separated from the surface of said combustion chamber during combustion of said liquid fuel by the combustion supporting gas.

2. A rocket engine, as claimed in claim 1, in which said cylindrical wall means of said swirl chamber comprises a cylindrical wall of a diameter larger than that of said circular opening; said first and second nozzle means being arranged in circumferentially spaced relation on said cylindrical wall; and a third nozzle means opening through said cylindrical wall in circumferentially spaced relation to said first and second nozzle means and constituting said means for introducing a combustion supporting gas into said combustion chamber.

3. A rocket engine for liquid fuels, as claimed in claim 1; said first and second nozzle means opening through said cylindrical wall; said means for introducing a combustion supporting gas into said combustion chamber comprising a nozzle extending through the other of said end wall means and into and through said circular opening, said last-named nozzle being constructed and arranged to introduce said combustion supporting gas into said combustion chamber tangentially thereof and with an axial velocity component toward the discharge end of said combustion chamber; said combustion chamber including a relatively small diameter cylindrical entry section disposed between said circular opening and the main portion of said transition section.

References Cited in the file of this patent

UNITED STATES PATENTS

| | | |
|---|---|---|
| 1,278,314 | Dix | Sept. 10, 1918 |
| 2,016,921 | Goddard | Oct. 8, 1935 |
| 2,453,378 | Lubbock | Nov. 9, 1948 |
| 2,536,600 | Goddard | Jan. 2, 1951 |
| 2,539,165 | Saha | Jan. 23, 1951 |
| 2,563,028 | Goddard | Aug. 7, 1951 |
| 2,563,029 | Goddard | Aug. 7, 1951 |
| 2,602,290 | Goddard | July 8, 1952 |
| 2,774,216 | Allen | Dec. 18, 1956 |